US008630530B2

(12) United States Patent
Sakamoto

(10) Patent No.: US 8,630,530 B2
(45) Date of Patent: *Jan. 14, 2014

(54) TIME SHIFT REPRODUCTION TIME CONTROLLING METHOD AND INFORMATION REPRODUCTION APPARATUS

(75) Inventor: Susumu Sakamoto, Tokyo (JP)

(73) Assignee: NEC Personal Computers, Ltd., Tokyo (JP)

( * ) Notice: Subject to any disclaimer, the term of this patent is extended or adjusted under 35 U.S.C. 154(b) by 1533 days.

This patent is subject to a terminal disclaimer.

(21) Appl. No.: 11/979,138

(22) Filed: Oct. 31, 2007

(65) Prior Publication Data

US 2008/0063356 A1    Mar. 13, 2008

Related U.S. Application Data

(63) Continuation of application No. 10/436,049, filed on May 13, 2003, now Pat. No. 7,315,686.

(30) Foreign Application Priority Data

May 14, 2002    (JP) ................................ 2002-139304

(51) Int. Cl.
    *H04N 9/80*    (2006.01)
(52) U.S. Cl.
    USPC ............................ 386/248; 386/291; 725/134
(58) Field of Classification Search
    CPC ....................................................... H04N 5/85
    USPC ........... 386/200–203, 239, 291; 725/143, 151
    See application file for complete search history.

(56) References Cited

U.S. PATENT DOCUMENTS

| 6,310,956 | B1 * | 10/2001 | Morito et al. | ................. 380/201 |
| 6,577,810 | B1 | 6/2003 | Ogino | |
| 2002/0071648 | A1 | 6/2002 | Matsumura et al. | |
| 2003/0066094 | A1 * | 4/2003 | van der Schaar et al. | ...... 725/151 |
| 2006/0188233 | A1 | 8/2006 | Matsumura et al. | |

FOREIGN PATENT DOCUMENTS

| JP | 6-014274 | 1/1994 |
| JP | 10-322648 | 12/1998 |
| JP | 11-073105 | 2/2000 |
| JP | 2001-298719 | 10/2001 |
| JP | 2002-010189 | 1/2002 |

\* cited by examiner

*Primary Examiner* — Thai Tran
*Assistant Examiner* — Mishawn Dunn
(74) *Attorney, Agent, or Firm* — Foley & Lardner LLP

(57) ABSTRACT

A time shift reproduction time controlling method and an information reproduction apparatus are disclosed wherein reproduction of data at time which is beyond time shift reproduction possible time is prevented with certainty. An input PCR extraction section extracts a PCR from a reception transport stream and outputs the extracted PCR to a subtractor. An output PCR extraction section extracts a PCR from a transport stream read out from a recording medium and outputs the extracted PCR to the subtractor. The subtractor subtracts time information from the output PCR extraction section from time information from the input PCR extraction section and outputs a result of the subtraction to a comparator. The comparator compares the output of the subtractor and output of a reproduction time control register in which a value indicating a time limit to time shift reproduction is stored with each other and outputs a result of the comparison to a reproduction stopping control section. The reproduction stopping control section performs control for outputting a transport stream outputted from a TS readout section to a video and audio decoder in accordance with the comparison result of the comparator.

10 Claims, 13 Drawing Sheets

FIG. 10

| TABLE IDENTIFICATION (73h) | SECTION SYNTAX INDICATION (0) | RESERVED (111) | SECTION LENGTH | PRESENT DATE | PRESENT TIME-OF-DAY | NOT DEFINED | DESCRIBER REGION LENGTH | DESCRIBER REGION | CRC |
|---|---|---|---|---|---|---|---|---|---|
| 8 | 1 | 3 | 12 | 16 | 24 | 4 | 12 | 8×N | 32 |

(Bit)

FIG. 11

| TABLE IDENTIFICATION (73h) | SECTION SYNTAX INDICATION (0) | RESERVED (111) | SECTION LENGTH | PRESENT DATE | PRESENT TIME-OF-DAY |
|---|---|---|---|---|---|
| 8 (Bit) | 1 | 3 | 12 | 16 | 24 | ial
TIME SHIFT REPRODUCTION TIME CONTROLLING METHOD AND INFORMATION REPRODUCTION APPARATUS

CROSS-REFERENCE TO RELATED PATENT APPLICATIONS

This application is a continuation of application Ser. No. 10/436,049, filed May 13, 2003, now pending, and based on Japanese Patent Application No. 2002-139304, filed May 14, 2002, by Susumu Sakamoto, which is incorporated herein by reference in its entirety. This application claims only subject matter disclosed in the parent application and therefore presents no new matter.

BACKGROUND OF THE INVENTION

1. Field of the Invention

The present invention relates to a time shift reproduction time controlling method for controlling time shift reproduction time and an information reproduction apparatus for controlling time shift reproduction time for use with a time shift reproduction system which can receive and temporarily record image data and sound data onto a recording medium and then reproduce an image and sound within predetermined time from the data recorded on the recording medium.

2. Description of the Related Art

Various reception apparatus which receive a digital television (digital TV) broadcast are available, and some of them have a time shift reproduction function which can temporarily record received encoded data onto a recording medium such as a hard disk (HD) and reproduce an image and sound from the encoded data recorded on the recording medium within time shift permitting time as a time limit. Use of the time shift reproduction function eliminates the necessity to effect reception of encoded data and reproduction of the encoded data simultaneously. Accordingly, even if a user temporarily leaves a reception apparatus in a situation wherein the user uses the reception apparatus to enjoy a TV program while the reception apparatus continues reception of encoded data, when the user subsequently returns to the location of the reception apparatus, the user can enjoy the TV program beginning with the contents of the TV program recorded at the point of time when the user left the reception apparatus. In other words, the reception apparatus can reproduce the program going back to the past by a fixed interval of time.

However, if the time within which it is permitted to record encoded data onto a recording medium is not limited, then the encoded data recorded on the recording medium may be re-utilized. For example, there is the possibility that the encoded data recorded on the recording medium may be transferred to and re-utilized on another apparatus such as a personal computer or may be provided from the user to and re-utilized by a third party. Since a provider of a TV program should originally receive an equivalent to re-utilization of its TV program, such re-utilization of encoded data of a user as described above spoils the benefit of the TV program provider, that is, the benefit based on the copyright.

Therefore, in order to limit the recording time of encoded data onto a recording medium, a limitation is provided to the storage region of a recording medium in a reception apparatus which has the time shift reproduction function. For example, such a countermeasure as to repetitively use a storage region for fixed time, that is, to overwrite the storage region with new encoded data for time exceeding the fixed time.

However, where the countermeasure is taken, encoded data within the storage region before overwritten with new encoded data can be stolen by successively transferring the encoded data to another storage area or to another recording medium. Although it becomes more and more significant to protect the copyright of a broadcasting program as popularization of the digital broadcasting proceeds, the countermeasure that the storage region for fixed time is repetitively used does not make a sufficient method for copyright protection.

Japanese Patent Laid-Open No. 2000-57059 discloses a system wherein, in order to prevent copying of encoded data of a broadcasting program or the like, the program providing side embeds time-of-day information into the encoded data using an electronic watermark technique and the reception apparatus side reproduces the time-of-day information and prevents reproduction of the encoded data at time of day after more than fixed time after the time-of-day indicated by the time-of-day information. With the system, however, if the time-of-day information is falsified, then reproduction of the encoded data is permitted at time of day after more than the fixed time after the time of day indicated by the time-of-day information.

Japanese Patent Laid-Open No. 2001-298719 discloses another system wherein the program providing side transmits transmission time-of-day information together with image data and the reception apparatus side reproduces the transmission time-of-day information and prevents reproduction of the image data at time of day after more than fixed time after the time of day indicated by the transmission time information. Also with the system just described, if the time-of-day information is falsified, then reproduction of the encoded data is permitted at time of day after more than the fixed time after the time of day indicated by the time-of-day information.

SUMMARY OF THE INVENTION

It is an object of the present invention to provide a time shift time reproduction time controlling method and an information reproduction apparatus by which reproduction of data at time of day after more than fixed time exceeding time shift permitting time can be prevented with certainty.

In order to attain the object described above, according to an aspect of the present invention, there is provided a time shift reproduction time control method for controlling a time limit in a case wherein input data is temporarily recorded and the recorded data is read out to perform time shift reproduction of information based on the recorded data, comprising the steps of calculating a difference between time indicated by time information included in the input data and time indicated by time information included in the recorded data, and permitting time shift reproduction if the difference is within a time limit determined in advance, but inhibiting the time shift reproduction if the difference is beyond the time limit.

Preferably, the input data is encoded data, and information used for reproduction of a decoding clock signal utilized to decode the encoded data is used as the time information included in the input data and the recorded data.

Preferably, the input data is reception data of digital broadcasting, and time information included in the digital broadcasting is used as the time information included in the input data and the recorded data.

The time shift reproduction time control method may be configured such that the input data is encrypted and temporarily recorded, and a decryption process is performed for the encrypted recorded data to regenerate the input data upon the time shift reproduction. In this instance, even if the encoded data temporarily recorded on the recording means is stolen, reproduction based on the encoded data cannot be performed.

The time shift reproduction time control method may be configured such that time information is produced using the clock signal produced based on the information used for reproduction of the decoding clock signal utilized to decode the encoded data, and the produced time information is added to the encoded data to produce the input data to be temporarily recorded. In this instance, even if a value of time information becomes non-continuous upon changeover of a broadcast program or the like, correct time information can be added to the encoded data.

The time shift reproduction time control method may be configured such that the input data is formed from a packet data string, and packet data is temporarily recorded except for packet data which is not used for reproduction. In this instance, the capacity of the recording means for recording the encoded data can be reduced.

The time shift reproduction time control method may be configured such that discontinuity of time indicated by the time information included in the input data is detected, and the discontinuity of time indicated by the time information is corrected upon the time shift reproduction. In this instance, incorrect calculation of time shift reproduction time can be avoided.

According to another aspect of the present invention, there is provided an information reproduction apparatus includes recording means for temporarily recording input data, means for implementing a time shift reproduction function for performing reproduction at a time-of-day different from a recording time-of-day based on the recorded data recorded by the recording means, and a time information control section for calculating a difference between time indicated by time information included in the input data and time indicated by time information included in the recorded data and permitting time shift reproduction if the difference is within a time limit determined in advance but inhibiting the time shift reproduction if the difference is beyond the time limit.

Preferably, the input data is encoded data, and the time information control section uses information used for reproduction of a decoding clock signal utilized to decode the encoded data as the time information included in the input data and the recorded data.

Where the input data is reception data of digital broadcasting, the information reproduction apparatus may further comprise an input time information extraction section for extracting time information included in digital broadcasting and outputting the time information to the time information control section and an output time information extraction section for extracting time information from within the encoded data read out from the recording means and outputting the time information to the time information control section.

The information reproduction apparatus may further comprise a time information inserting section for producing time information using a clock signal produced based on information used for reproduction of the decoding clock signal utilized to decode the encoded data and adding the produced time information to the encoded data to produce input data to be temporarily recorded.

Where the input data is formed from a packet data string, the information reproduction apparatus may further comprise an information deletion section for excepting packet data which is not used for reproduction and an interval regeneration section for regenerating a position of the packet data on a time axis based on the time information added to the encoded data. In this instance, even if discontinuity of a value of time information occurs upon changeover of a broadcast program or the like, correct time information is added to the encoded data.

The information reproduction apparatus may further comprise correction means for detecting discontinuity of time indicated by the time information included in the input data and correcting the discontinuity of time indicated by the time information upon the time shift reproduction. In this instance, even if discontinuity of a value of time information occurs upon changeover of a broadcast program or the like, correct time information is added to the encoded data.

The correction means may include input side correction means for calculating a difference between time indicated by time information included in newly inputted data and time indicated by the time information included in the input data inputted last and storing the difference if the difference is over a threshold value and time shift reproduction side correction means for calculating a difference between time indicated by time information included in data newly read out from the recording means and time indicated by time information included in data read out last from the recording means, and correcting, if the difference exceeds the threshold value, the time information based on the difference stored by the input side correction means.

The time information control section may include time limit storage means for storing a value which indicates a time limit of the time shift reproduction, a subtractor for performing a subtraction process between the time information outputted from the input time information extraction section and the time information outputted from the output time information extraction section, and a comparator for comparing a value stored in the time limit storage means and a result of the subtraction of the subtractor to decide whether or not the time shift reproduction should be permitted.

The information reproduction apparatus may further comprise an encryption section for encrypting the input data to be recorded by the recording means, and a decryption section for decrypting the encrypted data read out from the recording means. In this instance, even if the encoded data temporarily recorded on the recording means is stolen, reproduction based on the encoded data cannot be performed.

The information reproduction apparatus may further comprise a video and audio decoder for decoding the encoded data to reproduce video data and audio data and a reproduction stopping control section for stopping outputting of the encoded data to the video and audio decoder if the time shift reproduction is stopped by the time information control section.

Preferably, also within a period within which outputting of the encoded data to the video and audio decoder is stopped, the encoded data is read out from the recording means.

With the time shift reproduction time control method and information reproduction apparatus of the present invention, the difference between time indicated by time information included in input data and time indicated by time information included in recorded data is calculated, and, if the difference is within a time limit determined in advance, then time shift reproduction is permitted, but, if the difference is beyond the time limit, then the time shift reproduction is inhibited. Therefore, there is an advantage that reproduction of data at time which is beyond time shift reproduction possible time can be prevented with certainty.

Particularly, where information used for reproduction of a decoding clock signal used for decoding encoded data is used as time information of input data used in order to calculate the difference thereof from time indicated by time information included in recorded data, if time information is falsified, then an image and sound cannot be correctly reproduced. Therefore, the reproduction of data at time which is beyond the time shift reproduction possible time can be prevented with certainty.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 10 is a diagrammatic view showing a structure of a time offset table used in the information reproduction apparatus of FIG. 9;

FIG. 11 is a diagrammatic view showing a structure of a time data table used in the information reproduction apparatus of FIG. 9;

DESCRIPTION OF THE PREFERRED EMBODIMENTS

Figure 1:
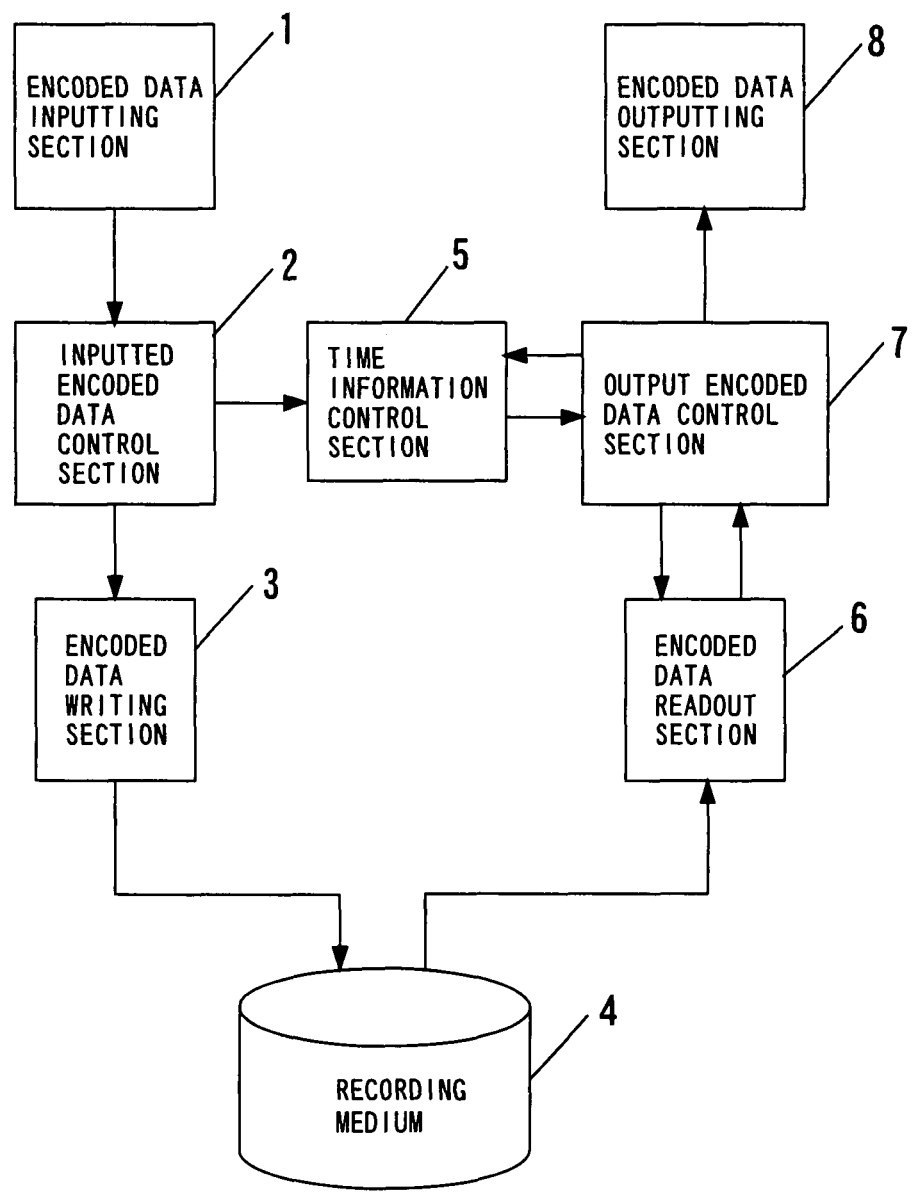
FIG. 1 is a schematic block diagram showing components of a time shift reproduction system according to the present invention which relate to inputting and outputting of encoded data.

FIG. 1 shows a time shift reproduction system which can carry out a time shift reproduction time controlling method according to the present invention and particularly shows those components which relate to inputting and outputting of encoded data.

Referring to FIG. 1, an encoded data inputting section 1 receives encoded data of an arbitrary video source designated by a user and outputs it to an inputted encoded data control section 2. The inputted encoded data control section 2 extracts time information included in the received data, and outputs the time information to a time information control section 5 and further outputs the received encoded data to an encoded data writing section 3. The encoded data writing section 3 writes the inputted encoded data onto a recording medium (recording means) 4 such as a hard disk (HD).

A user will perform an operation for starting reproduction after arbitrary time shift reproduction time. Information which indicates the fact that the operation just described is performed is inputted to an output encoded data control section 7. An encoded data readout section 6 reads out the encoded data from the recording medium 4 in response to a readout request of the output encoded data control section 7 based on an operation of the user and outputs the read out encoded data to the output encoded data control section 7. The output encoded data control section 7 extracts the time information included in the read out encoded data and outputs the extracted time information to the time information control section 5. The time information control section 5 uses the time information received from the inputted encoded data control section 2 as time information at present and uses the time information received from the output encoded data control section 7 as time information for time shift reproduction. Then, the time information control section 5 compares the time information at present and the time information for time shift reproduction with each other to discriminate whether or not the present time is within a time limit to the time shift reproduction time, and outputs a result of the discrimination to the output encoded data control section 7.

If the discrimination result of the time information control section 5 is not within the time limit to the time shift reproduction time, then the output encoded data control section 7 abandons the encoded data read out from the recording medium 4 or performs controlling for stopping outputting of the encoded data to an encoded data outputting section 8. On the other hand, if the discrimination result of the time information control section 5 is within the time limit to the time shift reproduction time, then the output encoded data control section 7 outputs the encoded data read out from the recording medium 4 to the encoded data outputting section 8. The encoded data outputting section 8 passes the encoded data received from the outputted encoded data control section 7 to a processing section at the following stage of the time shift reproduction system, for example, to a decoder.

First Embodiment

Figure 2:
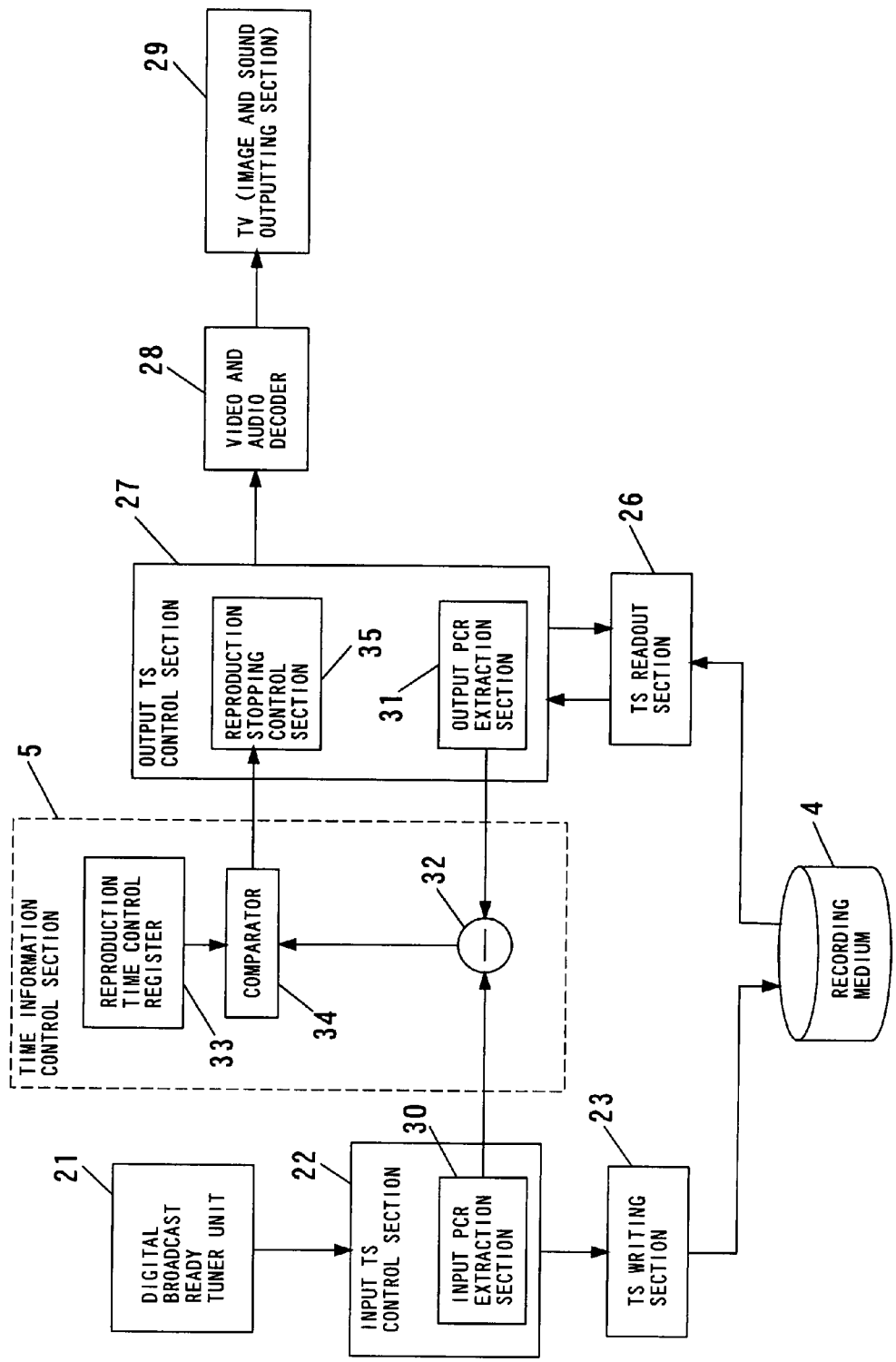
FIG. 2 is a block diagram showing an information reproduction apparatus to which the present invention is applied.

FIG. 2 is a block diagram showing an example of a configuration of an information reproduction apparatus which can carry out the time shift reproduction time controlling method according to the present invention. The information reproduction apparatus shown in FIG. 2 is an information reproduction apparatus which receives a radio wave of a digital broadcast and reproduces encoded data from the received radio wave of the digital broadcast and then reproduces an image and sound based on the encoded data. Further, in the information reproduction apparatus of the present embodiment, the encoded data is data based on the MPEG2 system. However, use of encoded data based on the MPEG2 system is not essentially required in the present invention.

Referring to FIG. 2, a tuner unit 21 ready for a digital broadcast (hereinafter referred to simply as tuner unit 21) reproduces data in the form of a transport stream (hereinafter referred to suitably as TS) including a program selected by a user from within a radio wave of a digital broadcast and outputs the data. An input TS control section 22 includes an input PCR (Program Clock Reference) extraction section 30 as an input time information extraction section for extracting time information from the transport stream received from the tuner unit 21. A TS writing section 23 writes the transport stream onto the recording medium 4. A TS readout section 26 reads out the transport stream from the recording medium 4 in response to a request from an output TS control section 27. The output TS control section 27 includes an output PCR (Program Clock Reference) extraction section 31 as an output time information extraction section for extracting time information included in the transport stream from the TS readout section 26 and a reproduction stopping control section 35 for performing transport stream output control to a video and audio decoder 28. A subtractor 32 subtracts time indicated by the time information extracted by the output TS control section 27 from time indicated by the time information extracted by the input TS control section 22. A reproduction time control register 33 serving as time limit storing means stores a reproduction time control value which indicates a time limit. A comparator 34 compares an output of the subtractor 32 and the stored value of the reproduction time control register 27 with each other. The video and audio decoder 28 reproduces the transport stream from the output TS control section 27. A television (TV) apparatus 27 serving as a video and audio output section provides a video signal and an audio signal outputted from the video and audio decoder 28 to a user. It is to be noted that the subtractor 32, reproduction time control register 33 and comparator 34 form the time information control section 5.

The tuner unit 21 particularly receives a radio wave of a digital broadcast and performs processes of decoding and error correction to extract encoded data, and outputs the encoded data to the input TS control section 22. The extracted data is digital data of such a transport stream of the MPEG2 adopted by digital broadcasting as shown in FIG. 3.

Figure 3:
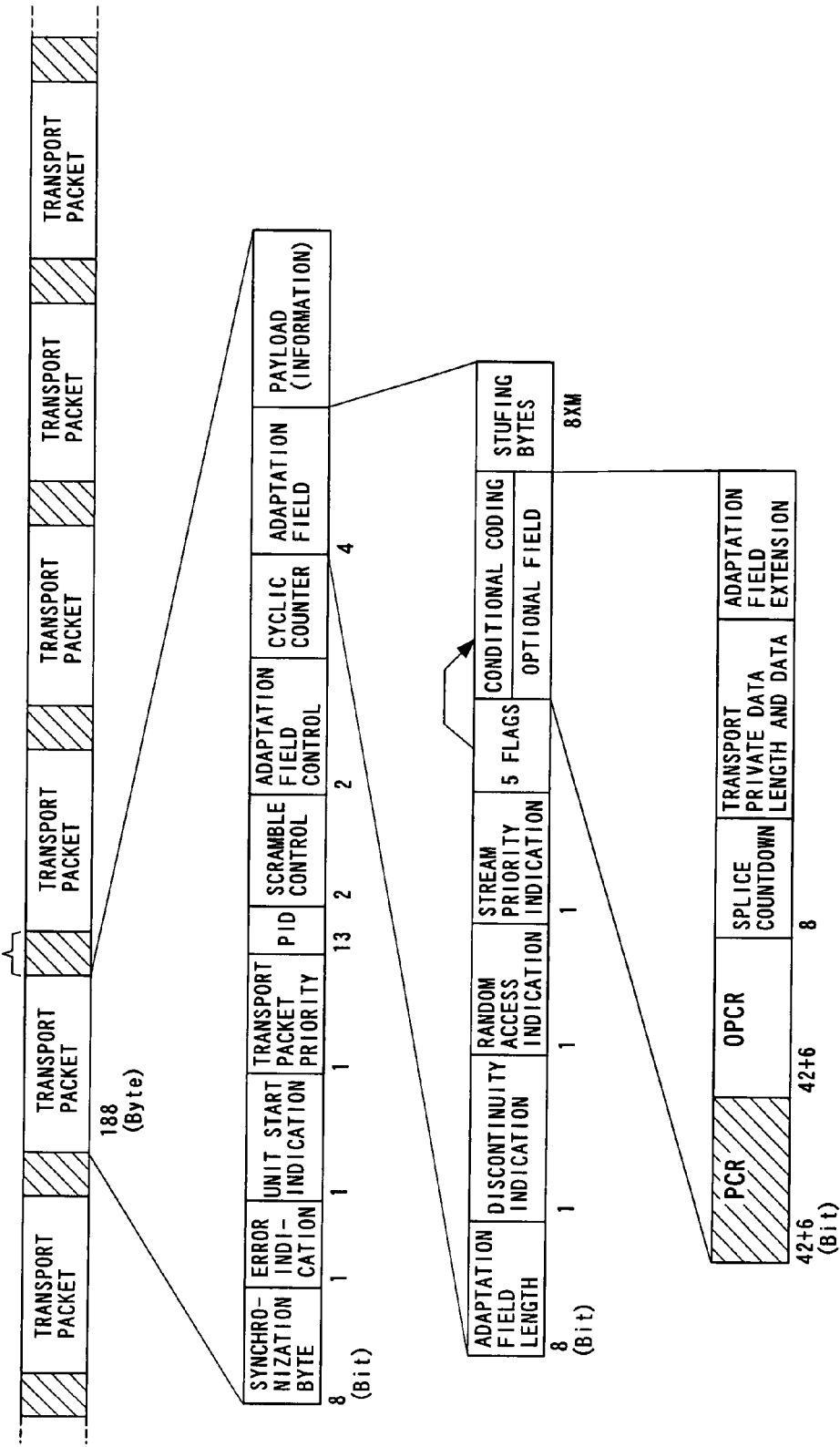
FIG. 3 is a diagrammatic view illustrating a data stream of the MPEG2 system.

As shown in FIG. 3, the transport stream is formed from a stream of transport packets having a fixed length of 188 bytes. An adaptation field is defined at a header part (portion except payload) in each transport packet. Time information Program Clock Reference (hereinafter referred to as PCR) having a length of 42+6 bits is included in the adaptation field.

The input TS control section 22 performs working of a transport stream having the structure shown in FIG. 3 and information analysis for allowing a user to receive a desired program from within the transport stream. Further, the input TS control section 22 outputs the transport stream to the TS writing section 23 for storing the data. The PCR extraction section 30 included in the input TS control section 22 extracts the time information PCR shown in FIG. 3 from within the transport stream received from the tuner unit 21 and outputs the extracted time information PCR to the subtractor 32. The TS writing section 23 outputs the transport stream received from the input TS control section 22 to the recording medium 4. The transport stream from the TS writing section 23 is recorded onto the recording medium 4.

The TS readout section 26 reads out the transport stream from the recording medium 4 in response to a request from the output TS control section 27 and output the read out transport stream to the output TS control section 27. The output TS control section 27 issues a readout request for the transport stream to the TS readout section 26 and performs control for outputting the transport stream to the video and audio decoder 28. Further, the output TS control section 27 stops the issuance of the readout request to the TS readout section 26 in response to a temporary stopping operation by a user. Further, if the time of the time shift reproduction is beyond the time limit, then the output TS control section 27 stops the outputting of the transport stream to the video and audio decoder 28.

The output PCR extraction section 31 included in the output TS control section 27 extracts the time information PCR from within the transport stream received from the TS readout section 26 and outputs the extracted time information PCR to the subtractor 32. The subtractor 32 subtracts the time information received from the output PCR extraction section 31 from the time information received from the input PCR extraction section 30 and outputs a result of the subtraction to the comparator 34. The reproduction time control register 33 stores time shift permission time, that is, a value which indicates a time limit to the time shift reproduction for every received program. The comparator 34 compares an output of the subtractor 32 and an output of the reproduction time control register 33 with each other and outputs a result of the comparison to the reproduction stopping control section 35. The reproduction stopping control section 35 performs control for outputting the transport stream outputted from the TS readout section 26 to the video and audio decoder 28 in accordance with the comparison result of the comparator 34. The video and audio decoder 28 decodes encoded data of an image and sound included in the transport stream outputted from the output TS control section 27 and outputs the decoded data to a TV apparatus 29. The TV apparatus 29 provides the image and sound to the user.

Figure 4:
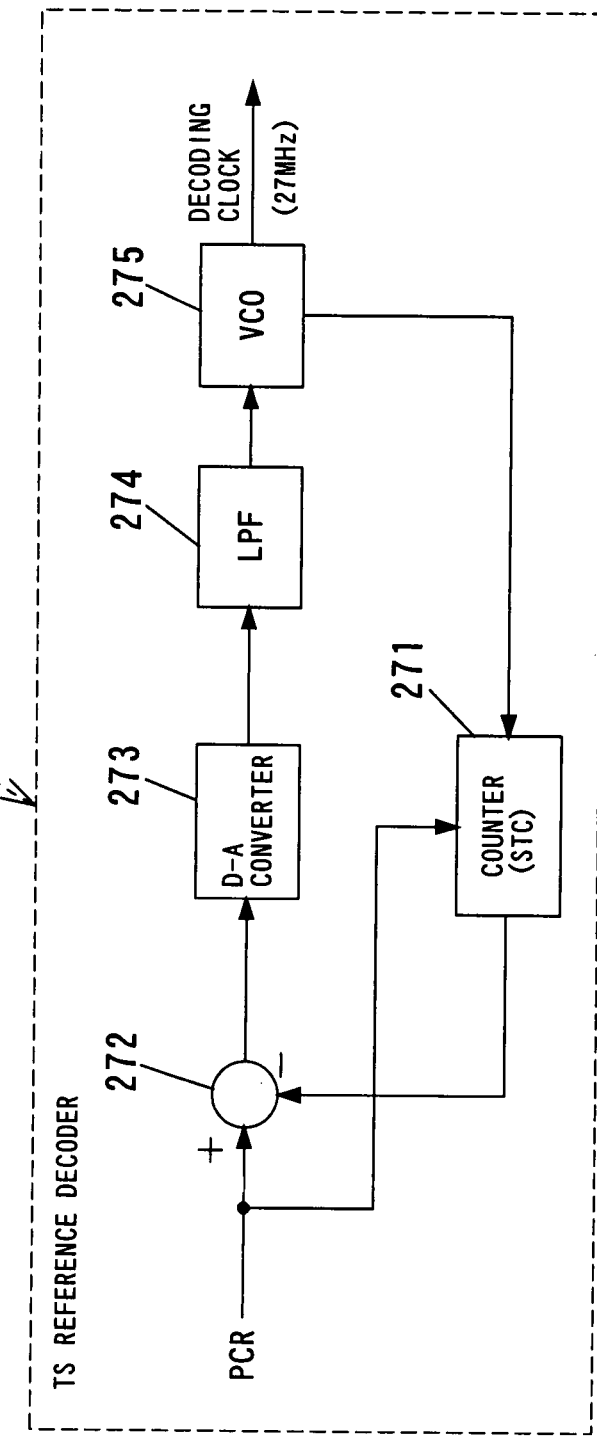
FIG. 4 is a block diagram showing a detailed configuration of a transport stream reference decoder provided in a video and audio decoder of the information reproduction apparatus of FIG. 2.

FIG. 4 is a block diagram showing a configuration of, for example, a TS reference decoder 28$a$ included in the video and audio decoder 28. The TS reference decoder 28$a$ receives time information PCR included in a transport stream and places the time information PCR into a counter (STC: System Time Clock) 271. A phase comparator 272 compares the inputted time information PCR and the set value of the counter 271 with each other and outputs a phase difference which is a result of the comparison to a digital to analog (D/A) converter 273. The D/A converter 273 outputs an analog signal which indicates the phase difference to a VCO (Voltage Controlled Oscillator) 275 through an LPF (low-pass filter) 274. The VCO 275 acts to eliminate the phase difference and outputs a resulting clock signal. By such a PLL (phase-locked loop) configuration as just described, the TS reference decoder 28$a$ can reproduce a system clock signal (decoding clock signal) having a frequency of 27 MHz based on the time information PCR.

Subsequently, action of the information reproduction apparatus of the present embodiment is described with reference to FIGS. 2 and 3. If a user selects a program which the user wants to enjoy, then the tuner unit 21 receives a radio wave in which the selected program is included and performs demodulation and error correction for the received radio wave and then outputs a resulting transport stream to the input TS control section 22. The input TS control section 22 analyzes information necessary for receiving the program and outputs only the transport stream necessary for storage to the TS writing section 23. The input PCR extraction section 30 included in the input TS control section 22 extracts the time information PCR shown in FIG. 3 from within the transport stream necessary for receiving the program. Here, low-order 33 bits in the time information PCR are extracted and outputted to the subtractor 32. Information indicated by the time information PCR to be outputted to the subtractor 32 is information which indicates present time-of-day at which the broadcast is being received at present. In the information reproduction apparatus of the present embodiment, the present time information based on the time information PCR being received at present and the time information based on the time information PCR for the time shift reproduction are compared with each other to calculate time shift elapsed time.

The transport stream outputted from the input TS control section 22 is recorded onto the recording medium 4 by the TS writing section 23. The TS readout section 26 reads out the transport stream from the recording medium 4 in accordance with a request from the output TS control section 27 and outputs the read out transport stream to the output TS control section 27. The output TS control section 27 issues, after the time shift reproduction time based on the operation of the user elapses, a TS readout request to the TS readout section 26 and receives the transport stream to be reproduced. The output PCR extraction section 31 extracts the time information PCR from the transport stream to be reproduced and sends the extracted time information PCR to the subtractor 32. The information indicated by the time information PCR to be sent to the subtractor 32 is information which indicates time later in the time shift reproduction with respect to the information indicated by the time information PCR outputted from the input PCR extraction section 30. The subtractor 32 subtracts the time information PCR transmitted thereto from the output PCR extraction section 31 from the time information PCR transmitted thereto from the input PCR extraction section 30 and transmits a result of the subtraction to the comparator 34. The subtraction result outputted to the comparator 34, that is, time difference information, corresponds to the reproduction shift time in the time shift reproduction based on the operation of the user.

Thirty-three bits of the PCR represent a value of a 33-bit counter which increments by one with 300 clocks of a 27-MHz clock signal which is used when a broadcasting station encodes and compresses a program. Accordingly, counting of $2^{33}/(27 \times 10^6/300)$ seconds (=approximately 26 hours) can be performed. In other words, counting for 24 hours can be sufficiently performed.

As shown in FIG. 4, in a reception system, the time information PCR is used in order to produce a decoding clock signal which is synchronized in phase with a frequency of a clock signal used for encoding. Further, in the information reproduction apparatus of the present embodiment, time shift reproduction time control is performed using the time information PCR. Accordingly, if, in order to cancel a time shift reproduction time limit, contents of the time information PCR are changed at a preceding stage to the output TS control section 27 or the like, then production of an encoding clock signal is not performed normally. As a result, in the video and audio decoder 28 and so forth provided at a following stage, an internal buffer or the like suffers from underflow, overflow or the like to cause a disorder in reproduction of an image and sound. In particular, if an operation for deceiving the time shift reproduction time limit is performed, then a problem that reproduction of an image and sound is disordered occurs. In other words, falsification of time information for misrepresenting the time shift reproduction time limit can be prevented.

When a limit is to be added to time shift reproduction time, a value corresponding to a time limit to the time shift reproduction time is placed into the reproduction time control register 33. For example, if time shift reproduction beyond 90 minutes is to be inhibited, then a value corresponding to 90 minutes is placed into the reproduction time control register 33. In the information reproduction apparatus of the present embodiment, since 300 clocks of the 27-MHz clock signal corresponds to 1, $90 \times 60 \times (27 \times 10^6/300) = 1CF7C580$ (hexadecimal number) is stored. For example, if information for adding a limit to the time shift reproduction time is transmitted from a contents provider such as a broadcasting station, then a time limit may be placed into the reproduction time control register 33.

It is to be noted that all of the 33 bits need not necessarily be used for the comparison, but, for example, only 16 higher order bits may be used for the comparison. If the 16 higher order bits are used, then the accuracy of the time shift reproduction time is approximately 1.6 seconds. However, the scale of the circuit can be reduced.

The comparator 34 outputs a result of comparison between an output from the subtractor 32 and a set value of the reproduction time control register 33 to the reproduction stopping control section 35. The reproduction stopping control section 35 performs controlling for outputting or stopping the transport stream to the video and audio decoder 28 in accordance with the comparison result of the comparator 34. In particular, if the time of the time shift reproduction is within the time limit, then the transport stream is outputted, and as a result, the user can perform the time shift reproduction. However, if the time shift reproduction time is beyond the time limit, then outputting of the transport stream is stopped. Consequently, the user cannot perform the time shift reproduction. It is to be noted that the comparison result of the comparator 34 corresponds to a result of discrimination of whether or not the time shift reproduction should be allowed.

Also during outputting stopping control of the transport stream, the output TS control section 27 continues issuance of a readout request to the TS readout section 26. As a result, a portion of the transport stream which is beyond the time limit to the time shift reproduction is ignored, but time shift reproduction only of a portion of the transport stream within the time limit is automatically performed.

First Modification to the First Embodiment

Figure 5:
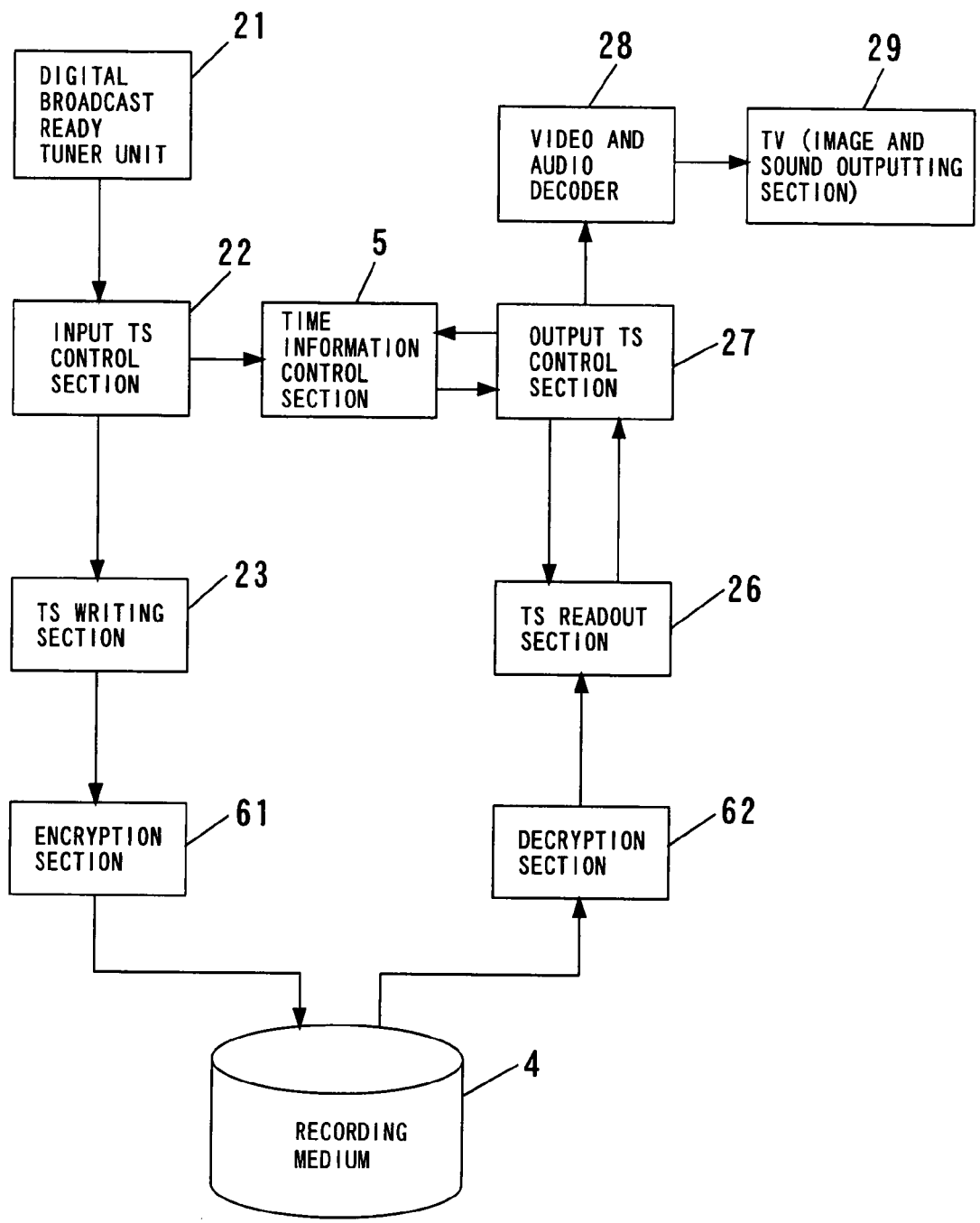
FIGS. 5 and 6 are block diagrams showing modifications to the information reproduction apparatus of FIG. 2.

Now, a modification to the information reproduction apparatus of the first embodiment is described with reference to a block diagram of FIG. 5. In the information reproduction apparatus of the embodiment shown in FIG. 2, if a time limit to the time shift reproduction is exceeded, then an image and sound cannot be reproduced. However, if data stored in the recording medium 4 is extracted from the information reproduction apparatus before it is reproduced, then there is the possibility that the data may be reproduced by another reproduction system. Therefore, the modified information reproduction apparatus is configured such that, as shown in FIG. 5, an encryption section 61 for performing encryption of data is provided intermediately on the path from the TS writing section 23 to the recording medium 4, and a decryption section 62 for decrypting the encrypted data is provided intermediately on the path from the recording medium 4 to the TS readout section 26. The other components in the information reproduction apparatus are similar to those shown in FIG. 2.

In the present modified information reproduction apparatus, just before a transport stream is temporarily recorded onto the recording medium 4 for the time shift reproduction, encryption is performed for the transport stream to be recorded. Further, just before the time shift reproduction is performed, the transport stream read out from the recording medium 4 is decrypted. Accordingly, the information reproduction apparatus in the present modification is configured such that, even if the transport stream temporarily recorded on the recording medium 4 is stolen, reproduction based on the transport stream cannot be performed. It is to be noted that the present modified information reproduction apparatus acts in a similar manner to that of the information reproduction apparatus of the first embodiment except that just described.

Second Modification to the First Embodiment

Figure 6:
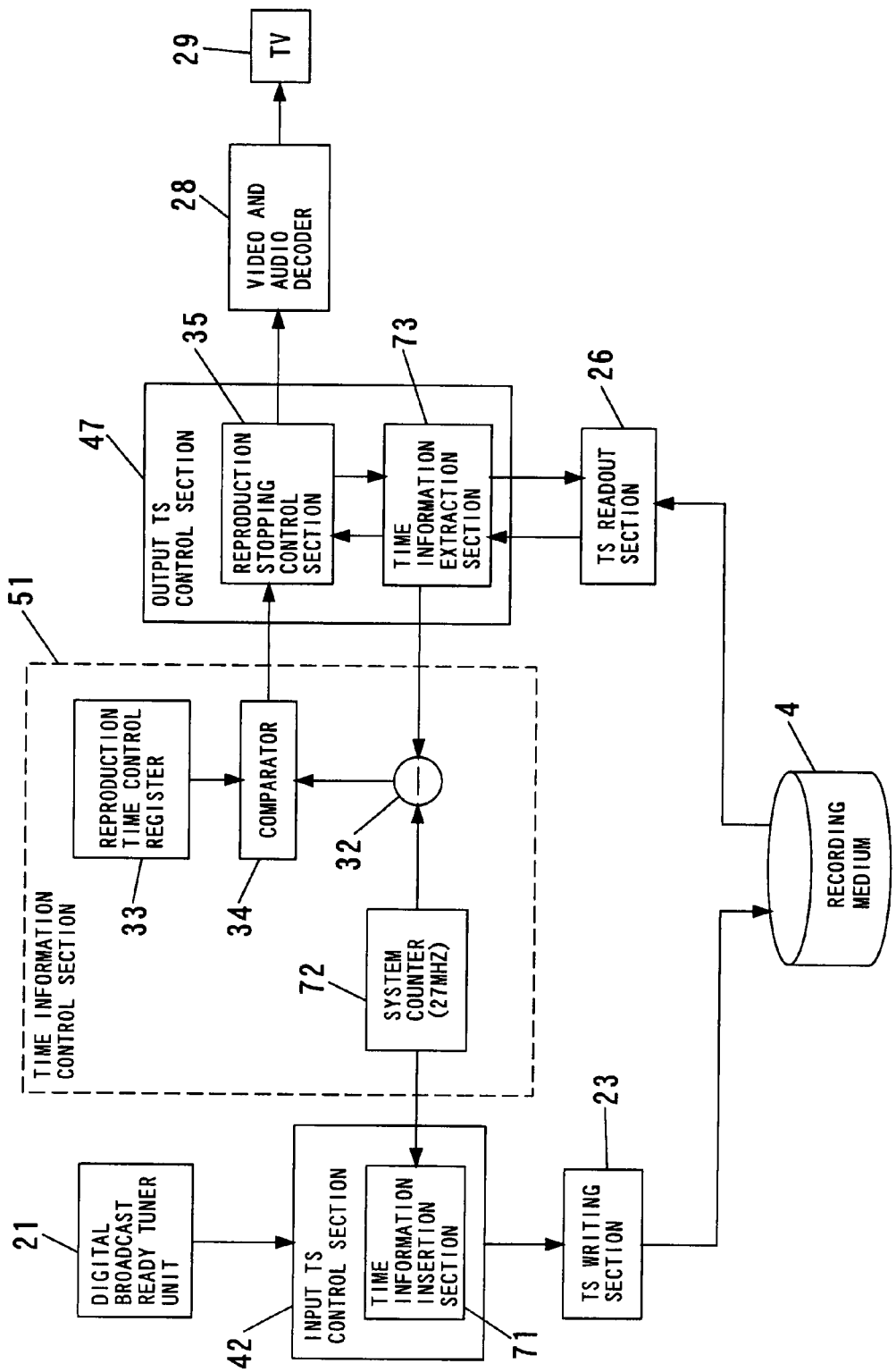
Figure 7:
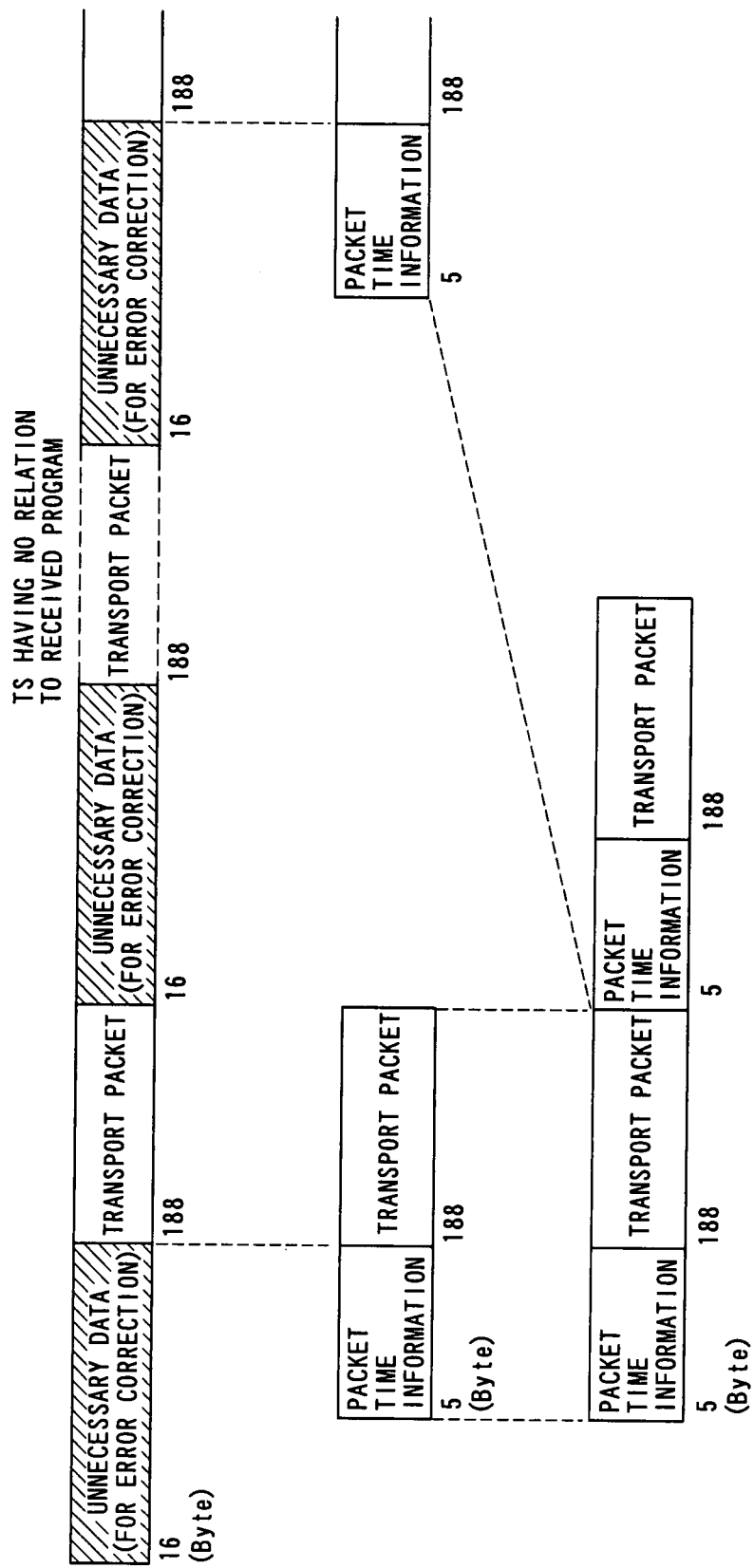
FIG. 7 is a signal sequence diagram illustrating a data stream of a digital broadcast.

The information reproduction apparatus of the first embodiment described above may be modified also in such a manner as seen in FIG. 6. While, in the information reproduction apparatus of the first embodiment and the first modification, time information PCR included in a transport stream is used to control the time shift reproduction time, in the present modified information reproduction apparatus, time information which indicates a distance (position on the time base) of a transport packet is added to the top of each transport packet as seen in FIG. 7.

In the following, only differences of the present modified information reproduction apparatus from the information reproduction apparatus of the embodiment described above are described. Referring to FIG. 6, the present modified information reproduction apparatus is different from the information production apparatus of the first embodiment of FIG. 2 in that it includes an input TS control section 42, an output TS control section 47 and a time information control section 51 in placed of the input TS control section 22, output TS control section 27 and time information control section 5, respectively. The time information control section 51 additionally includes a system counter 72 of 27 MHz. Meanwhile, the input TS control section 42 includes, in place of the input PCR extraction section 30, a time information addition section 71 for producing time information using a count value from the system counter 72 and adding the produced time information to the top of each transport packet as shown in FIG. 7. Further, the output TS control section 47 includes, in place of the output PCR extraction section 31, a time information extraction section 73 for extracting the time information added to the top of each transport packet and sending the extracted time information to the subtractor 32.

The system counter 72 produces a count value based on time information PCR using a decoding clock signal (27 MHz) synchronized with an encoding clock signal for image data and sound data used in a broadcasting station. Further, the system counter 72 is formed, for example, from 40 bits, and performs count-up using the decoding clock signal.

The time information produced by the time information addition section 71 is utilized also for regenerating the distance of each transport packet. As shown in FIG. 7, transport streams used for broadcasting include also a transport stream which does not relate to a reception program selected by the user (refer to the first stage of FIG. 7). It is not necessary to record the transport stream, which does not relate to the reception program selected by the user, onto the recording medium 4. Accordingly, if, when a transport stream is to be recorded onto the recording medium 4, the transport stream not relating to the reception program selected by the user is erased, then the capacity necessary for recording can be reduced.

However, if the transport stream not relating to the reception program selected by the user is recorded onto the recording medium 4, then continuity of time information based on the time information PCR in transport streams recorded on the recording medium 4 is spoiled. In particular, a transport stream which is in a state wherein information which indicates an interval of a transport stream upon broadcasting is not normal is recorded onto the recording medium 4. Accordingly, in this case, if the transport stream is read out from the recording medium 4, then transport packets thereof cannot be regenerated with a correct time interval.

Therefore, in the present modified information reproduction apparatus, the time information addition section 71 adds time information which indicates an interval of each transport packet to the top of the transport packet. It is to be noted that, though not shown in FIG. 7, the time information addition section 71 adds the time information to all of transport packets. Meanwhile, as shown in the third stage of FIG. 7, the input TS control section 42 outputs only a transport stream which relates to the reception program selected by the user to the TS writing section 23. Accordingly, the input TS control section 42 also implements a function as an information reduction section for removing packet data not used for reproduction. It is to be noted that, in the present modified information reproduction apparatus, data outputted from the input TS control section 42 corresponds to input data including time information.

Only a transport stream relating to the reception program selected by the user is recorded onto the recording medium 4. The output TS control section 47 regenerates an interval of each transport packet (refer to the second stage of FIG. 7) based on the time information added to the transport stream read out from the recording medium 4. For example, the output TS control section 47 outputs a next transport packet to the video and audio decoder 28 later, with respect to a time point at which a certain transport packet is outputted to the video and audio decoder 28, by time of a difference between the time information added to the transport packet and the time information added to the next transport packet. Accordingly, the output TS control section 47 also has a function as an interval regeneration section for regenerating an interval of packet data (position on the time base) based on time information added to encoded data.

If the time information added to the top of a transport packet is used only for regeneration of an interval of the transport packet, then, where a system clock of 27 MHz is used, approximately 32 bits are sufficient for the time information. If 32 bits are used, then counting of $2^{32}/(27\times10^6)$ seconds (approximately 159 seconds) can be performed. However, if the time information is expanded to 40 bits, then the time information can be used for control of time shift reproduction time. If 40 bits are used, then counting of $2^{40}/(27\times10^6)$ seconds (approximately 11 hours) can be performed.

The time information added to the top of each transport packet is used for regenerating the interval of the transport packet to be reproduced. Therefore, if the time information is falsified, then, underflow or overflow of an internal buffer occurs in the video and audio decoder 28, and an error that an image and sound are not reproduced normally occurs. Consequently, also in the present modified information reproduction apparatus, falsification of the time information can be prevented similarly as in the information reproduction apparatus of the first embodiment and the first modification.

The system counter 72 always performs count-up based on a decoding clock signal produced in the information reproduction apparatus. Accordingly, even if the value of the time information PCR becomes discontinuous upon changeover of a broadcast program or the like, correct time information can be added to the top of the transport packet.

Third Modification to the First Embodiment

Figure 8:
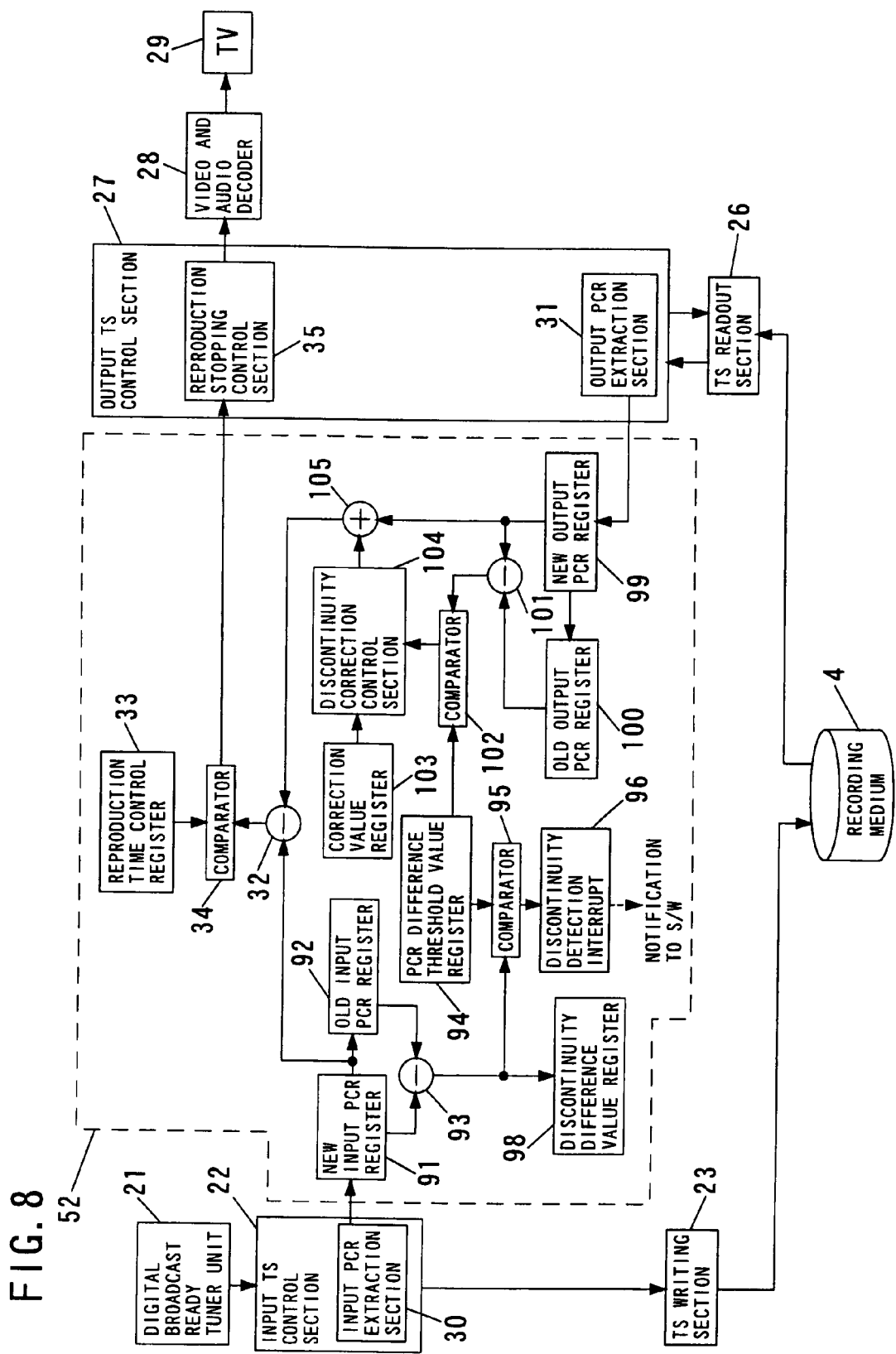
FIGS. 8 and 9 are block diagrams showing different modifications to the information reproduction apparatus of FIG. 2.

The information reproduction apparatus of the first embodiment described above may be modified also in such a manner as seen in FIG. 8. The information reproduction apparatus of the present modification is different from the information reproduction apparatus of the first embodiment only in that it includes, in place of the time information control section 5, a time information control section 52 for comparing time information PCR upon reception, that is, time information PCR outputted from the input TS control section 22, and time information PCR upon time shift reproduction, that is, time information PCR outputted from the output TS control section 27, with each other.

If the place of electric wave signaling equipment is changed over upon changeover of a program or because of a local downpour of rain or in a like case, then there is the possibility that discontinuity of time indicated by the time information PCR may occur. In the information reproduction apparatus of the embodiment and the first modification, if discontinuity of time indicated by time information PCR occurs, then time shift reproduction time is calculated but incorrectly. However, with the present modified information reproduction apparatus, such incorrect calculation as just described can be avoided.

In the following, description is given only of the difference of the present modified information reproduction apparatus from the information reproduction apparatus of the embodiment described above. Referring to FIG. 8, the time information control section 52 includes, in addition to a subtractor 32, a reproduction time control register 33 and a comparator 34 described hereinabove with reference to FIG. 2, a new input PCR register 91 for storing time information PCR outputted from the input TS control section 22 and transferring different time information PCR set in advance therein, an old input PCR register 92 for storing a value of input time information PCR received last from the new input PCR register 91, a subtractor 93 for calculating the difference between the value stored in the new input PCR register 91 and the value stored in the old input PCR register 92, a PCR difference threshold value register 94 for storing a threshold value to be used for discrimination that the PCR difference value calculated by the subtractor 93 is a discontinuous value, a comparator 95 for comparing an output of the subtractor 93 and the stored value of the threshold value register 94 with each other, a discontinuity detection interrupt generation section 96 for issuing a notification that discontinuity of the time information PCR occurs to software based on a result of an output of the comparator 95 and outputting a storing instruction of the PCR difference value when the discontinuity occurs, and a discontinuity difference value register 98 for storing an output (PCR difference value) of the subtractor 93 in response to an instruction from the discontinuity detection interrupt generation section 96. The components described above correspond to correction means on the reception side (input side correction means) which detects discontinuity of time indicated by time information included in input data. Further, the components from the tuner unit 21 to the recording medium 4 correspond to those on the reception side.

Further, the time information control section 52 includes a new output PCR register 99 for storing time information PCR outputted from the output TS control section 27 and transferring different time information PCR stored in advance, an old output PCR register 100 for storing a value of the time information PCR transferred from the new output PCR register in the last cycle, a subtractor 101 for calculating a difference between the value stored in the new output PCR register 99 and the value stored in the old output PCR register 100, a comparator 102 for comparing an output of the subtractor 101 and the stored value of the PCR difference threshold value register 94 with each other, a correction value register 103 in which a difference correction value to be used upon occurrence of discontinuity of the time information PCR is set in advance and which corrects the time information PCR when it is discriminated from a result of the comparator 102 that discontinuity of the time information PCR occurs, a discontinuity correction control section 104 for outputting the value of the correction value register 103 based on a result of the comparison of the comparator 102, and an adder 105 for adding the correction value outputted from the discontinuity correction control section 104 to the time information PCR for time shift reproduction. The components described above correspond to correction means on the time shift reproduction side for correcting discontinuity of time indicated by time information. Further, the components from the recording medium 4 to the video and audio decoder 28 correspond to those on the time shift reproduction side.

It is to be noted that the value of the discontinuity difference value register 98 at a point of time when a notification issued from the discontinuity detection interrupt generation section 96 is received is set by software to the correction value register 103. The software just mentioned is a control section including a CPU not shown in FIG. 8. It is to be noted that the value of the discontinuity difference value register 98 may be transferred otherwise by hardware to the correction value register 103.

Next, action of the present modified information reproduction apparatus is described. A sufficiently higher value than a fluctuation value of the time information PCR when a normal program is received is set in advance to the PCR threshold value register 94 by software. In the time information control section 52, if discontinuity of the time information PCR occurs on the reception side, then the first time information PCR when the discontinuity occurs is stored as new time information PCR into the new input PCR register 91. It is assumed that, at this time, such high old time information PCR that the difference thereof from new input time information PCR exceeds the stored value of the PCR difference threshold value register 94 is stored in the old input PCR register 92.

Accordingly, a result of subtraction outputted from the subtractor 93 is a value which exceeds the stored value of the PCR difference threshold value register 94. The comparator 95 compares the stored value of the PCR difference threshold value register 94 and the subtraction result of the subtractor 93 with each other and outputs a result of the comparison to the discontinuity detection interrupt generation section 96. The discontinuity detection interrupt generation section 96 issues, if it discriminates based on the comparison result of the comparator 95 that discontinuity of time indicated by the time information PCR occurs, an instruction to store an output value of the subtractor 93 into the discontinuity difference value register 98 and issues an interruption notification for notifying the software of the fact that discontinuity of time indicated by the time information PCR occurs. The software reads out the stored value of the discontinuity difference value register 98 in response to the notification from the discontinuity detection interrupt generation section 96 and sets the read out value to the correction value register 103.

In this case, discontinuity of time indicated by the time information PCR occurs on the time shift reproduction side after time shift reproduction time. If discontinuity of time indicated by the time information PCR occurs, then the first time information PCR after the discontinuity occurs is stored into the new output PCR register 99 first. At this time, such old time information PCR that the difference thereof from the new input PCR exceeds the stored value of the PCR difference threshold value register 94 is stored in the old output PCR register 100. The subtractor 101 outputs a result of the subtraction between the stored value of the new output PCR register 100 and the stored value of the old output PCR register 100.

The comparator 102 compares the stored value of the PCR difference threshold value register 94 and the subtraction result of the subtractor 101 with each other and outputs a result of the comparison to the discontinuity correction control section 104. The discontinuity correction control section 104 outputs, if it discriminates based on the output value of the subtractor 101 that discontinuity of time indicated by the time information PCR occurs, the value stored in the correction value register 103 to the adder 105. The adder 105 adds the correction value to the stored value of the new output PCR register 99 and outputs a result of the addition as time information PCR for the time shift reproduction to the subtractor 32. The difference value at a point of time when discontinuity of time indicated by the time information PCR occurs upon reception of a broadcast is stored in the correction value register 103. Consequently, by such control as described above, discontinuity of the time information PCR on the time shift reproduction side is eliminated.

Accordingly, in the present modified information reproduction apparatus, even if discontinuity of a value of the time information PCR occurs upon changeover of a broadcast program or the like, time shift reproduction time can be calculated normally.

Fourth Modification to the First Embodiment

Figure 9:
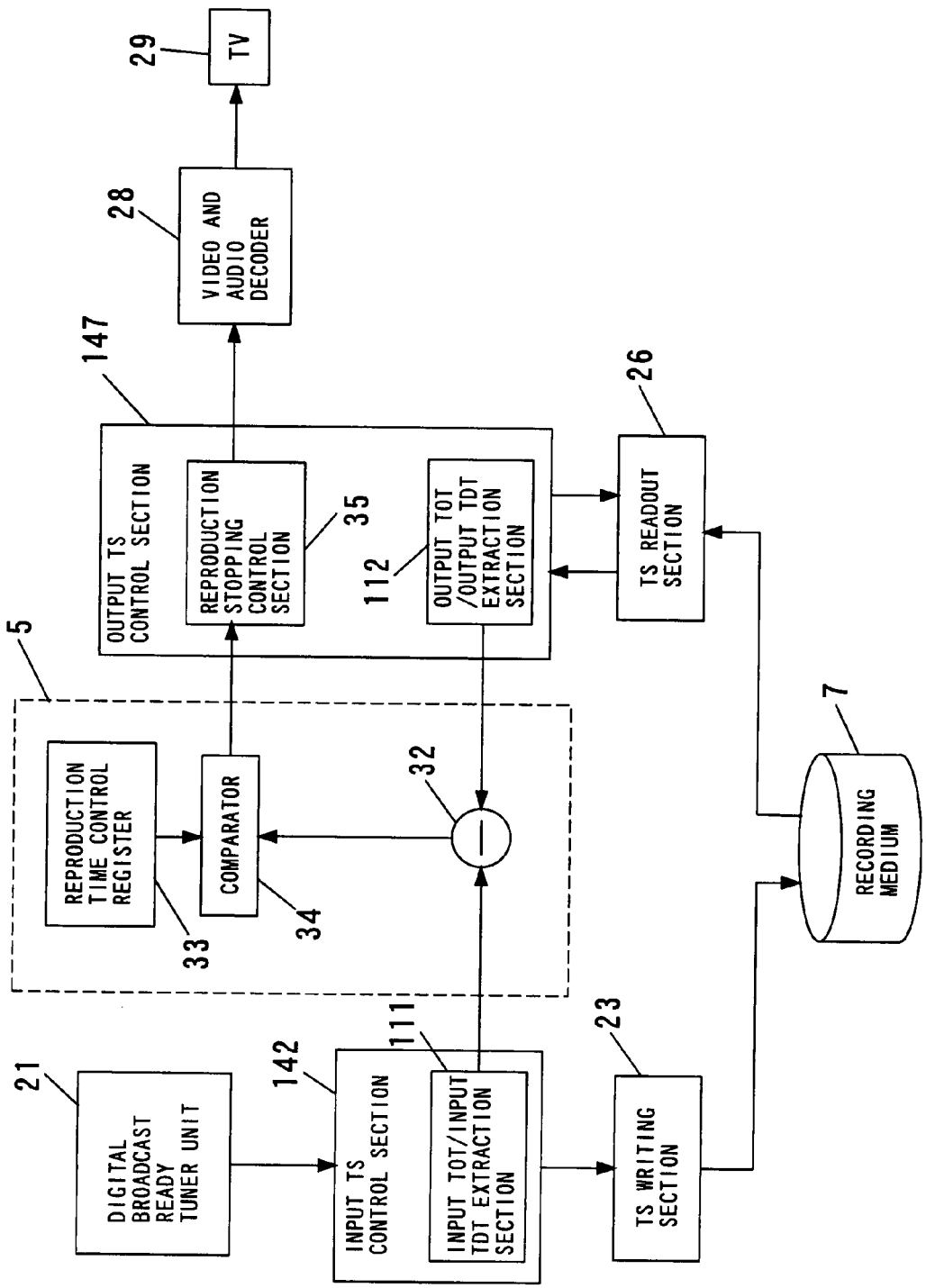

The information reproduction apparatus of the first embodiment described above may be modified also in such a manner as seen in FIG. 9. The information reproduction apparatus of the present modification is different from the information reproduction apparatus of the first embodiment in that it includes, in place of the input TS control section 42 and the output TS control section 47, an input TS control section 142 including an input TOT/input TDT extraction section 111 and an output TS control section 147 including a reproduction stopping control section 35 and an output TOT/output TDT extraction section 112, and hence in that, while the time information used in the information reproduction apparatus described above is time information PCR applied in the MPEG2, Time Offset Table (hereinafter referred as TOT) information and Time Date Table (hereinafter referred to as TDT) information are used. The TOT and TDT are defined by the ARIB STD-B10 which prescribes program arrangement information prescribed for BS/CS digital broadcasting.

The TOT has a structure shown in FIG. 10 and includes present time-of-day information of 24 bits. Meanwhile, the TDT has a structure shown in FIG. 11 and includes, similarly to the TOD, present time-of-day information of 24 bits. Accordingly, if the TOT and TDT are used, then advantages similar to those of the information reproduction apparatus described hereinabove can be obtained. However, the time information in the information reproduction apparatus of the present embodiment (that is, TOT/TDT) is not used for reproduction of a decoding clock signal and so forth. Therefore, falsification of time information can be easily performed in comparison with that of the information reproduction apparatus described hereinabove. Further, while the transmission interval of time information PCR is 100 ms, the transmission interval of the TOT and TDT is an interval in a unit of second. Therefore, the time control accuracy is reduced. However, since the bit number of the time information is as small as 24 bits, there is an advantage that the circuit scale can be reduced. Further, also the time information handled is in a unit of second, and also date information is included in the TOT and TDT (refer to FIGS. 10 and 11). Therefore, there is an advantage that long time management can be performed in time shift time control in comparison with those in the information reproduction apparatus described above.

It is to be noted that the manner of control regarding the time shift reproduction is similar to that of the information reproduction apparatus of the embodiment and the first modification described hereinabove.

Second Embodiment

Figure 12:
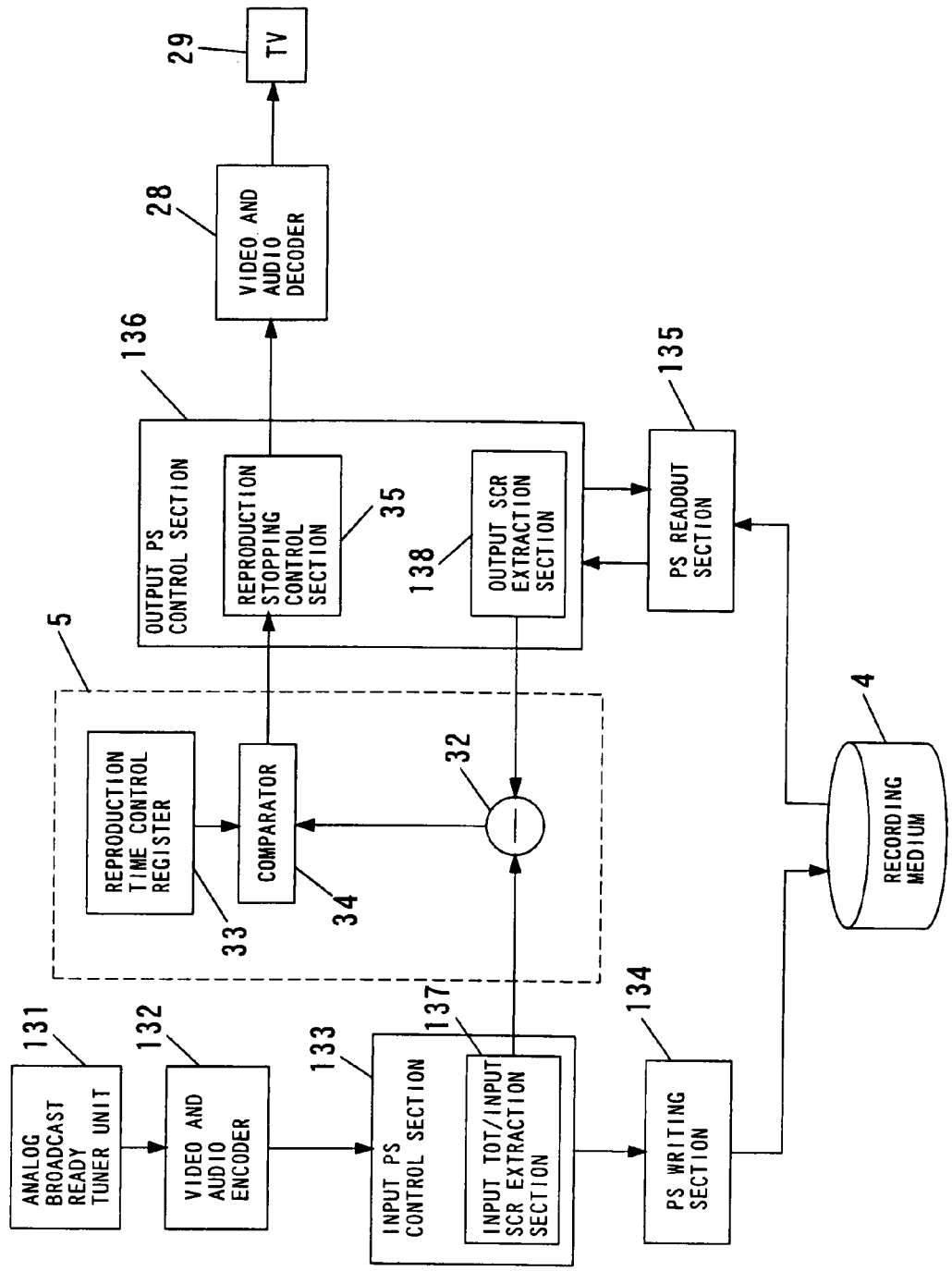
FIG. 12 is a block diagram showing another information reproduction apparatus to which the present invention is applied.

Referring now to FIG. 12, there is shown another information reproduction apparatus to which the present invention is applied. The information processing apparatus according to the present embodiment is, different from the information processing apparatus of the first embodiment and the modifications to it, applied to an analog broadcast. The information reproduction apparatus shown includes an analog broadcast ready tuner unit (hereinafter referred to simply as tuner unit) 131 for receiving an analog broadcast and outputting an image signal and a sound signal, a video and audio encoder 132 for encoding the image signal and sound signal, for example, in accordance with the MPEG2 method and outputting a program stream (hereinafter referred to suitably as PS) having a structure shown in FIG. 13, an input PS control section 133 including an input SCR extraction section 137, which extracts time information System Clock Reference (hereinafter referred to as time information SCR) from within a program stream, for analyzing a program stream outputted from the video and audio encoder 132, a PS writing section 134 for recording the program stream onto the recording medium 4, a PS readout section 135 for reading out the program stream from the recording medium 4, an output PS control section 136 including an output SCR extraction section 138 for extracting time information SCR from the program stream read out from the recording medium 4 and a reproduction stopping control section 35, a time information control section 5 including a subtractor 32, a reproduction time control register 33 and a comparator 34, a video and audio encoder 28, and a TV apparatus 29.

Figure 13:
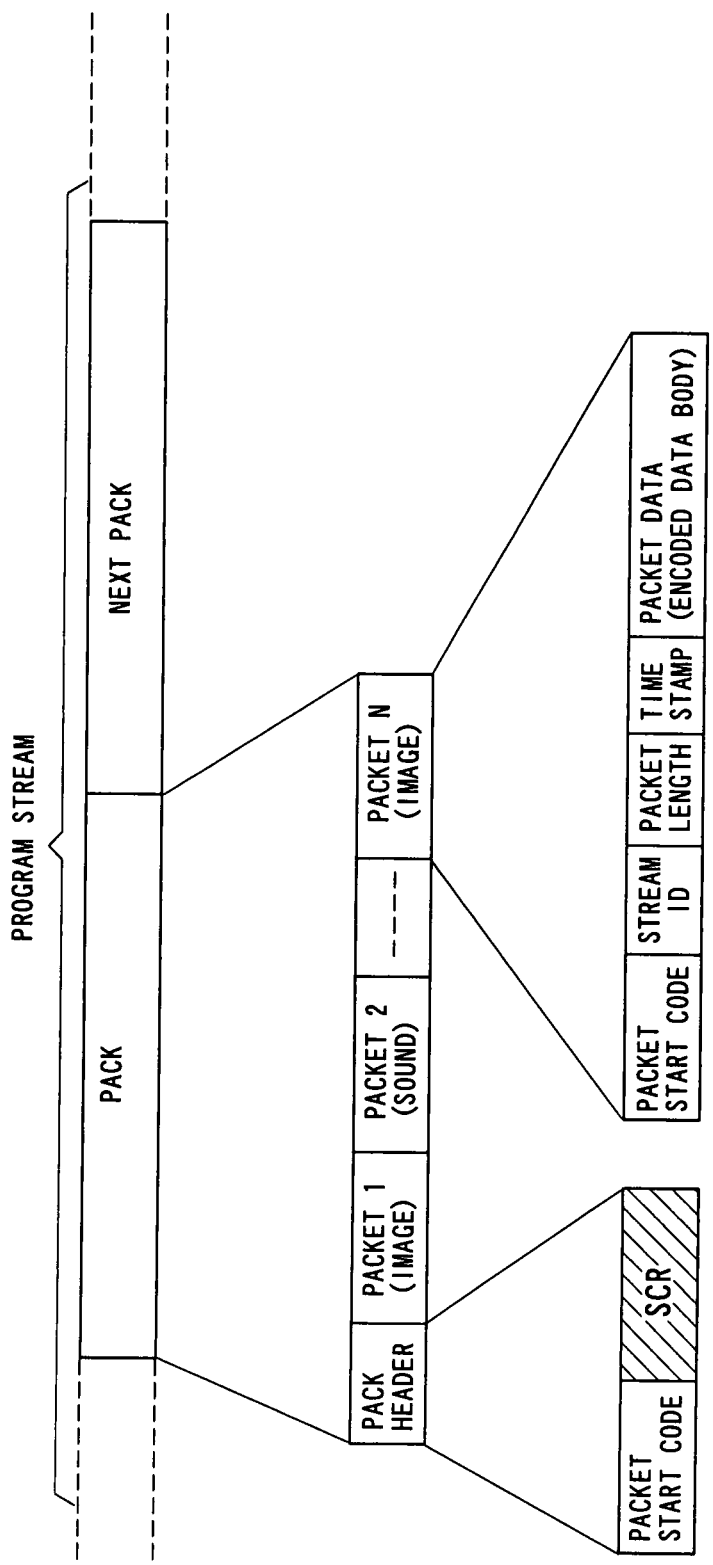
FIG. 13 is a diagrammatic view illustrating a program stream.

Now, action of the information reproduction apparatus of the present embodiment is described. If a user selects a program, then the tuner unit 131 outputs an image signal and a sound signal of the selected program. The video and audio encoder 132 encodes the image signal and the sound signal. While any one of a program stream and a transport stream can be used as an output of the video and audio encoder 132, in the present information reproduction apparatus, a program stream is used. A program stream has a structure wherein each pack is formed from a pack header, an image packet and a sound packet as seen in FIG. 13. Further, the video and audio encoder 132 produces time information using, for example, a clock function built-in the information reproduction apparatus and uses the produced time information as the time information SCR. It is to be noted that, in the present information reproduction apparatus, encoded data outputted from the video and audio encoder 132 corresponds to input data including time information.

The input PS control section 133 performs information analysis of the program stream outputted from the video and audio encoder 132 in a similar manner as in the information analysis performed for a transport stream by the input TS control sections 22 and 42 in the information processing apparatus described hereinabove. The input SCR extraction section 137 extracts time information SCR shown in FIG. 13 from within the program stream and outputs the time information SCR to the subtractor 32. Further, the input SCR extraction section 137 outputs the program stream to the PS writing section 134. The PS writing section 134 writes the received program stream onto the recording medium 4. The PS readout section 135 reads out, in response to a readout request from the output PS control section 136, the program stream from the recording medium 4 and outputs it to the output PS control section 136. The output PS control section 136 performs information analysis of the received program stream in a similar manner as in the information analysis performed for a transport stream by the output TS control sections 27 and 47 in the information processing apparatus described hereinabove. The output SCR extraction section 138 extracts time information SCR from within the program stream and outputs it to the subtractor 32. It is to be noted that the action of the time information control section 5 formed from the subtractor 32, reproduction time control register 33 and comparator 34 is similar to that of the information processing apparatus of the first embodiment and the first modification to the first embodiment.

Accordingly, similarly to the reproduction stopping control section 35 in the information processing apparatus of the first embodiment and the first modification to the first embodiment, the reproduction stopping control section 35 in the output PS control section 136 performs program stream output control to the video and audio decoder 28 in accordance with a result of the outputting of the comparator 34. In particular, if the time of the time shift reproduction is within the time limit, then the program stream is outputted, and as a result, the user can perform the time shift reproduction. However, if the time shift reproduction time is beyond the time limit, then the outputting of the program stream is stopped. Consequently, the user cannot perform the time shift reproduction any more. Also during the outputting stopping control of a program stream, the output PS control section 137 continues issuance of the readout request for a program stream to the PS readout section 136. As a result, a portion of the program stream which is beyond the time limit to the time shift reproduction is ignored, but time shift reproduction only of a portion of the program stream within the time limit is automatically performed.

As described above, according to the information reproduction apparatus of the present embodiment, the time control of the time shift reproduction can be performed also for an analog broadcast.

As described above, in the information reproduction apparatus of the embodiments and the modifications described above, a time limit to the time shift reproduction is observed with certainty. Since the time information management and output control of encoded data to the video and audio decoder 28 are performed by hardware, reproduction of a temporarily recorded stream which is beyond a time limit to the time shift reproduction can be reliably prevented.

Further, if time information is falsified, then an image and sound cannot be correctly reproduced. In particular, since time information for producing a decoding clock signal synchronized with an encoding clock used for encoding of an image signal and a sound signal by a broadcast station is used for management of time shift time, if time information of a temporarily recorded stream is falsified, then an error in reproduction occurs.

Furthermore, an information reproduction apparatus wherein a time limit to time shift reproduction is observed with certainty can be implemented simply. This is because the information reproduction apparatus can be implemented by adding a time information remaining function, a subtractor, a comparator, and an output control function of encoded data.

It is to be noted that the information reproduction apparatus according to the second to fourth modifications to the first embodiment and the second embodiment may be modified such that, similarly as in the information reproduction apparatus of the first modification to the first embodiment, input data is encrypted and recorded onto the recording medium 4 and the encrypted data read out from the recording medium 4 is decrypted to regenerate the input data.

While preferred embodiments of the present invention have been described using specific terms, such description is for illustrative purposes only, and it is to be understood that changes and variations may be made without departing from the spirit or scope of the following claims.

What is claimed is:

1. A time shift reproduction time controlling method for digital broadcasting for controlling a time limit in a case wherein reception data of digital broadcasting which includes time information is temporarily stored into recording means and the data recorded in the recording means is read out to perform time shift reproduction of information based on the recorded data, comprising the steps of:

extracting, when time shift reproduction of information based on the recorded data recorded in the recording means is to be performed, the time information included in the recorded data;

calculating a difference between time indicated by the extracted time information and time indicated by the time information included in the reception data currently received; and permitting the time shift reproduction of the information if the calculated difference is within the time limit determined in advance; but inhibiting the time shift reproduction if the difference exceeds the time limit, wherein the reception data is encoded data, and information used for reproduction of a decoding clock signal utilized to decode the encoded data is used as the time information included in the reception data and the recorded data; and information used for reproduction of a decoding clock signal utilized to decode the encoded data is used for regenerating a position of the encoded data on a time axis.

2. A time shift reproduction time controlling method as claimed in claim 1, wherein time information that is not included in the digital broadcasting is used as the time information included in the recorded data.

3. A time shift reproduction time controlling method as claimed in claim 2, wherein time information that is used as the time information included in the recorded data is obtained from built-in clock function at the time of encoding the data recorded in the recording means.

4. A time shift reproduction time controlling method as claimed in claim 1, wherein the data recorded in the recording means has been encrypted, and a decryption process is performed for the encrypted recorded data to regenerate the recorded data upon the time shift reproduction.

5. A time shift reproduction time controlling method as claimed in claim 1, wherein time information is produced using a clock signal produced based on the information used for reproduction of the decoding clock signal utilized to decode the encoded data, and the produced time information is added to the encoded data to produce the input data to be temporarily recorded.

6. A reproduction apparatus for digital broadcasting recording information which includes recording means for temporarily recording reception data of digital broadcasting which includes time information and has a time shift reproduction function for performing reproduction at time displaced from the recording time based on the recorded data recorded in said recording means, comprising:

reproduction of information based on the recorded data recorded in the recording means is to be performed, the time information included in the recorded data; and time information control means for calculating a difference between time indicated by the extracted time information and time indicated by the time information included in the reception data currently received and permitting the time shift reproduction of the information if the calculated difference is within the time limit determined in advance but inhibiting the time shift reproduction if the difference exceeds the time limit, wherein the reception data is encoded data, and information used for reproduction of a decoding clock signal utilized to decode the encoded data is used as the time information included in the reception data and the recorded data; and information used for reproduction of a decoding clock signal utilized to decode the encoded data is used for regenerating a position of the encoded data on a time axis.

7. A reproduction apparatus as claimed in claim 6, wherein time information that is not included in the digital broadcasting is used as the time information included in the recorded data.

8. A reproduction apparatus as claimed in claim 7, wherein time information that is used as the time information included in the recorded data is obtained from built-in clock function at the time of encoding the data recorded in the recording means.

9. A reproduction apparatus as claimed in claim 6, wherein the data recorded in the recording means has been encrypted, and a decryption process is performed for the encrypted recorded data to regenerate the recorded data upon the time shift reproduction.

10. A reproduction apparatus as claimed in claim 6, wherein time information is produced using a clock signal produced based on the information used for reproduction of the decoding clock signal utilized to decode the encoded data, and the produced time information is added to the encoded data to produce the input data to be temporarily recorded.

* * * * *